United States Patent
Jung et al.

(10) Patent No.: US 10,271,247 B2
(45) Date of Patent: Apr. 23, 2019

(54) DISCOVERY ANNOUNCEMENT METHOD PERFORMED BY TERMINAL IN WIRELESS COMMUNICATION SYSTEM, AND TERMINAL USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,100

(22) PCT Filed: Apr. 8, 2016

(86) PCT No.: PCT/KR2016/003732
§ 371 (c)(1),
(2) Date: Oct. 3, 2017

(87) PCT Pub. No.: WO2016/163821
PCT Pub. Date: Oct. 13, 2016

(65) Prior Publication Data
US 2018/0084465 A1    Mar. 22, 2018

Related U.S. Application Data

(60) Provisional application No. 62/144,342, filed on Apr. 8, 2015.

(51) Int. Cl.
*H04W 36/00* (2009.01)
*H04W 8/00* (2009.01)
(Continued)

(52) U.S. Cl.
CPC ......... *H04W 36/0061* (2013.01); *H04W 8/00* (2013.01); *H04W 36/08* (2013.01); *H04W 48/20* (2013.01)

(58) Field of Classification Search
CPC ....... H04W 4/02; H04W 36/08; H04W 36/12; H04W 36/14; H04W 36/18; H04W 36/30;
(Continued)

(56) References Cited

U.S. PATENT DOCUMENTS

| 2014/0242963 A1* | 8/2014 | Novlan | H04W 48/16 455/418 |
| 2015/0271657 A1* | 9/2015 | Xiong | H04W 8/005 370/329 |
| 2018/0146401 A1* | 5/2018 | Fujishiro | H04W 48/18 |

FOREIGN PATENT DOCUMENTS

| KR | 10-2014-0125633 A | 10/2014 |
| WO | WO 2014/130156 A1 | 8/2014 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.4.0, 2015, 38 pages.

(Continued)

*Primary Examiner* — Temica M Beamer
(74) *Attorney, Agent, or Firm* — Birch, Stewart, Kolasch & Birch, LLP

(57) ABSTRACT

The present invention relates to a device-to device (D2D) operation method performed by a terminal in a wireless communication system. The method comprises: separately receiving, from a serving cell, measurement bandwidth information about a frequency not included in information indicative of a measurement object for the purpose of supporting the mobility of the terminal; measuring the frequency not included in the measurement object for the purpose of supporting the mobility on the basis of the measurement bandwidth information; selecting a cell on the frequency; and performing discovery announcement on the cell.

2 Claims, 16 Drawing Sheets

(51) Int. Cl.
*H04W 36/08* (2009.01)
*H04W 48/20* (2009.01)

(58) Field of Classification Search
CPC ... H04W 64/00; H04W 76/02; H04W 76/021; H04W 76/028; H04W 84/18; H04W 84/22; H04W 88/06
USPC .................................. 455/436, 41.2, 435.2
See application file for complete search history.

(56) References Cited

FOREIGN PATENT DOCUMENTS

WO　　WO 2014/209451 A1　12/2014
WO　　WO 2015/021267 A1　2/2015

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8)", 3GPP TS 36.304 V8.5.0, 2009; 30 pages.

ITRI, "On Discovery Type and RRC Mode in the LTE Device to Device Discovery", 3GPP TSG RAN2 Meeting #83bis, R2-133112, Ljubljana, Slovenia; Oct. 7-11, 2013, 5 pages.

* cited by examiner

DISCOVERY ANNOUNCEMENT METHOD PERFORMED BY TERMINAL IN WIRELESS COMMUNICATION SYSTEM, AND TERMINAL USING SAME

CROSS REFERENCE TO RELATED APPLICATIONS

This application is the National Phase of PCT International Application No. PCT/KR2016/003732, filed on Apr. 8, 2016, which claims priority under 35 U.S.C. 119(e) to U.S. Provisional Application No. 62/144,342, filed on Apr. 8, 2015, all of which are hereby expressly incorporated by reference into the present application.

BACKGROUND OF THE INVENTION

Field of the Invention

The present invention relates to wireless communication and, more particularly, to a device-to-device (D2D) operation method executed by a terminal in a wireless communication system, and to the terminal using the method.

Related Art

In the International Telecommunication Union Radio Communication Sector (ITU-R), standardization of International Mobile Telecommunication (IMT)-Advanced, which is a next generation mobile communication system after the third generation mobile communication system is underway.

IMT-Advanced aims to support IP (Internet Protocol)-based multimedia service at data transmission rates of 1 Gbps in a stationary and low-speed moving state and 100 Mbps in a fast moving state.

The 3rd Generation Partnership Project (3GPP) is preparing, as a system standard that meets the requirements of IMT-Advanced, LTE-Advanced (LTE-A), that is, an improved version of LTE (Long Term Evolution) based on OFDMA (Orthogonal Frequency Division Multiple Access)/SC-FDMA (Single Carrier-Frequency Division Multiple Access). LTE-A is one of the strong candidates for IMT-Advanced.

Recently, interest in D2D (Device-to-Device) technology, which is a direct communication technology between devices, is increasing. In particular, D2D is attracting attention as a communication technology for public safety networks. Commercial communications networks are rapidly changing to LTE. However, in terms of conflicts with existing communication standards and cost, current public safety networks are mainly based on 2G technology. These technological gaps and demands for improved services have led to efforts to improve public safety networks.

Public safety networks have higher service requirements (reliability and security) than commercial communication networks. In particular, public safety networks are demanding direct signal transmission and reception between devices, that is. D2D operation, even when the coverage of cellular communication is insufficient or cellular communication is not available.

D2D operation may have various advantages in terms of signal transmission/reception between adjacent devices. For example, the D2D terminal may perform data communication at a high data rate and a low delay. Further, due to the D2D operation, the traffic concentrated on the base station may be distributed. When the D2D terminal functions as a repeater, the corresponding terminal may also serve to expand the coverage of the base station.

In this connection, if the wireless device is interested in performing a discovery announcement on a frequency not listed in the reselection frequency information received via the system information, the wireless device may not know the measurement bandwidth of the frequency (that is, the frequency not listed in the reselection frequency information).

In response to this, there is provided a method in accordance with the present invention, wherein if the system information on the frequency to be used by the wireless device to perform the discovery announcement is insufficient, the wireless device receives measurement bandwidth information for a frequency unlisted in the frequency list and performs discovery announcement based on the received bandwidth information. Further, in accordance with the present invention, a wireless device supporting the discovery announcement is provided.

SUMMARY OF THE INVENTION

The present invention provides a D2D operation method performed by a wireless device in a wireless communication system and a wireless device using the D2D operation method.

In an aspect, a method for device-to-device (D2D) operation in a wireless communication system is provided. The method is performed by a user equipment (UE) and comprises receiving, from a serving cell, measurement bandwidth information about a frequency not included in information indicating a measurement target for supporting mobility of the UE, separately, selecting a cell corresponding to the frequency by measuring the frequency not included in the measurement target for supporting the mobility of the wireless device based on the measurement bandwidth information, performing discovery announcement on the selected cell.

When the wireless device is in a Radio Resource Control (RRC) idle state, the information indicating the measurement target for supporting the mobility of the wireless device may be System Information Block 5 (SIB5), wherein the measurement bandwidth information is measurement bandwidth information about a frequency not included in the SIB 5.

Performing the discovery announcement may include changing a primary cell of the wireless device to the selected cell and performing the discovery announcement on the selected cell.

Performing the discovery announcement may include performing the discovery announcement on the selected cell while maintaining a primary cell of the wireless device as a cell that the wireless device is camping on.

When the wireless device may be in a RRC connected state, the information indicating the measurement target for supporting the mobility of the wireless device is configuration information including a list of the measurement targets, wherein the measurement bandwidth information is measurement bandwidth information about a frequency not included in the list of the measurement targets.

The measurement bandwidth information may be acquired via dedicated RRC signaling.

If the SIB 5 received from the network contains information available as the measurement bandwidth information, the wireless device may determine the available information as the measurement bandwidth information, wherein if the SIB 5 received from the network does not contain information available as the measurement bandwidth information, the wireless device determines a value provided via dedicated RRC signaling as the measurement bandwidth information.

In another aspect, a user equipment (UE) is provided. The UE comprises a radio frequency (RF) unit configured to transmit and receive a radio signal, and a processor operatively coupled to the RF unit, wherein the processor is configured to separately receive measurement bandwidth information from a serving cell via the RE unit, wherein the measurement bandwidth information is about a frequency not included in information indicating a measurement target for supporting mobility of the wireless device, select a cell corresponding to the frequency by measuring the frequency not included in the measurement target for supporting the mobility of the wireless device based on the measurement bandwidth information, and perform discovery announcement on the selected cell.

When the wireless device is in a Radio Resource Control (RRC) idle state, the information indicating the measurement target for supporting the mobility of the wireless device may be System Information Block 5 (SIB5), wherein the measurement bandwidth information is measurement bandwidth information about a frequency not included in the SIB 5.

Performing the discovery announcement may include changing a primary cell of the wireless device to the selected cell and performing the discovery announcement on the selected cell.

Performing the discovery announcement may include performing the discovery announcement on the selected cell while maintaining a primary cell of the wireless device as a cell that the wireless device is camping on.

When the wireless device may be in a RRC connected state, the information indicating the measurement target for supporting the mobility of the wireless device is configuration information including a list of the measurement targets, wherein the measurement bandwidth information is measurement bandwidth information about a frequency not included in the list of the measurement targets.

The measurement bandwidth information may be acquired via dedicated RRC signaling.

If the SIB 5 received from the network contains information available as the measurement bandwidth information, the wireless device may determine the available information as the measurement bandwidth information, wherein if the SIB 5 received from the network does not contain information available as the measurement bandwidth information, the wireless device determines a value provided via dedicated RRC signaling as the measurement bandwidth information.

In accordance with the present invention, there is provided a D2D operation method performed by a wireless device in a wireless communication system and a wireless device using the D2D operation method.

In accordance with the present invention, when the wireless device performs a D2D operation, and if the wireless device does not have sufficient system information about the frequency used to perform the discovery announcement, the wireless device may additionally receive measurement bandwidth information about the frequency that is not in the frequency list. Then, the wireless device may perform discovery announcement based on the bandwidth information. This allows the wireless device to perform the discovery announcement on frequencies other than the frequency that it has previously used for reception, thereby increasing the efficiency of the discovery announcement.

DETAILED DESCRIPTION OF THE INVENTION

Figure 1:
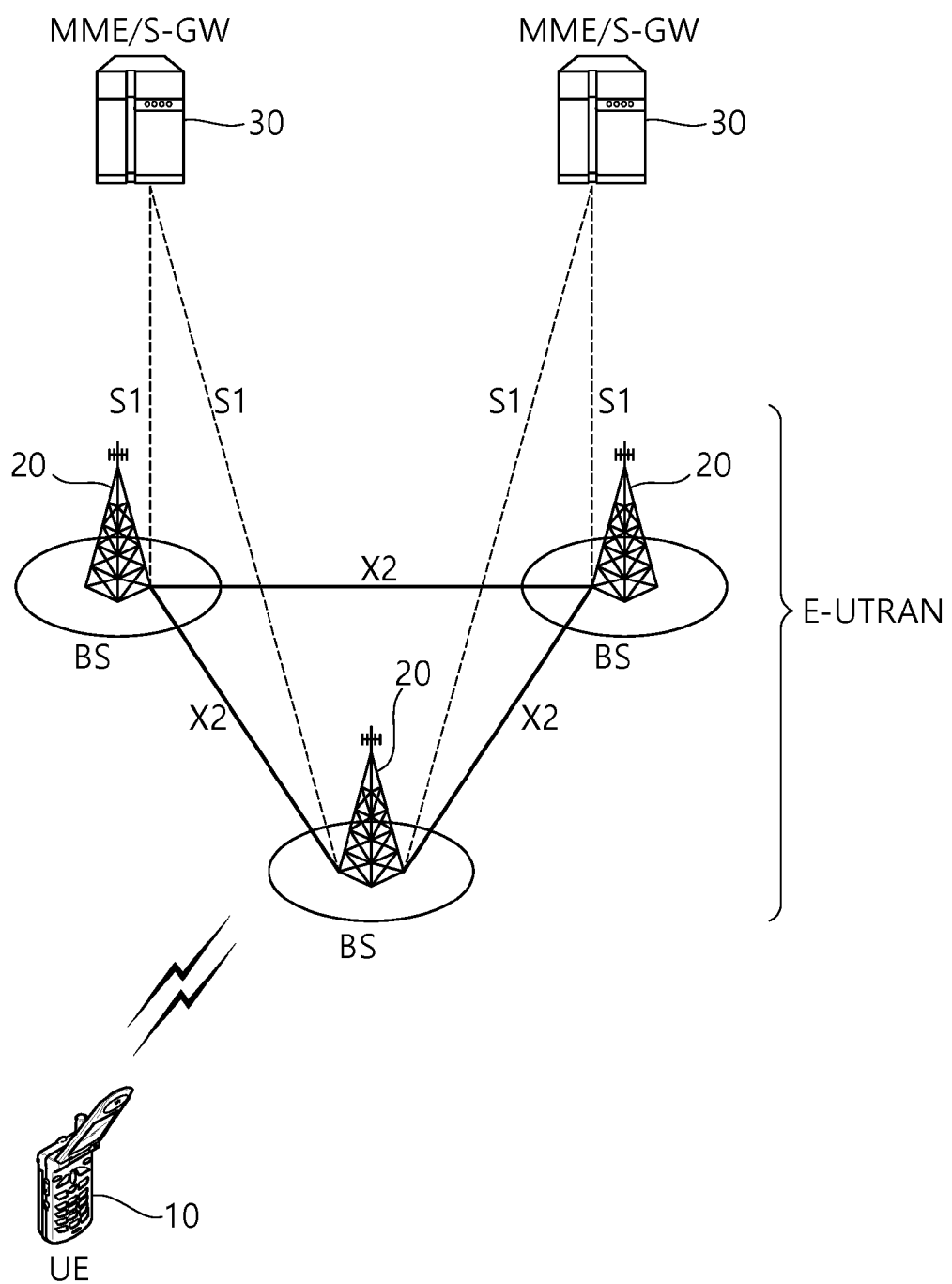
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
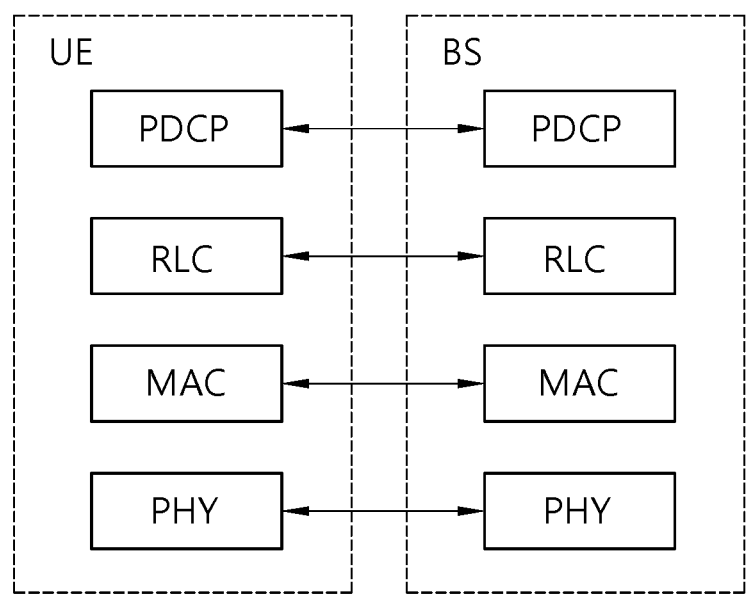
FIG. 2 is a diagram showing a wireless protocol architecture for a user plane.
Figure 3:
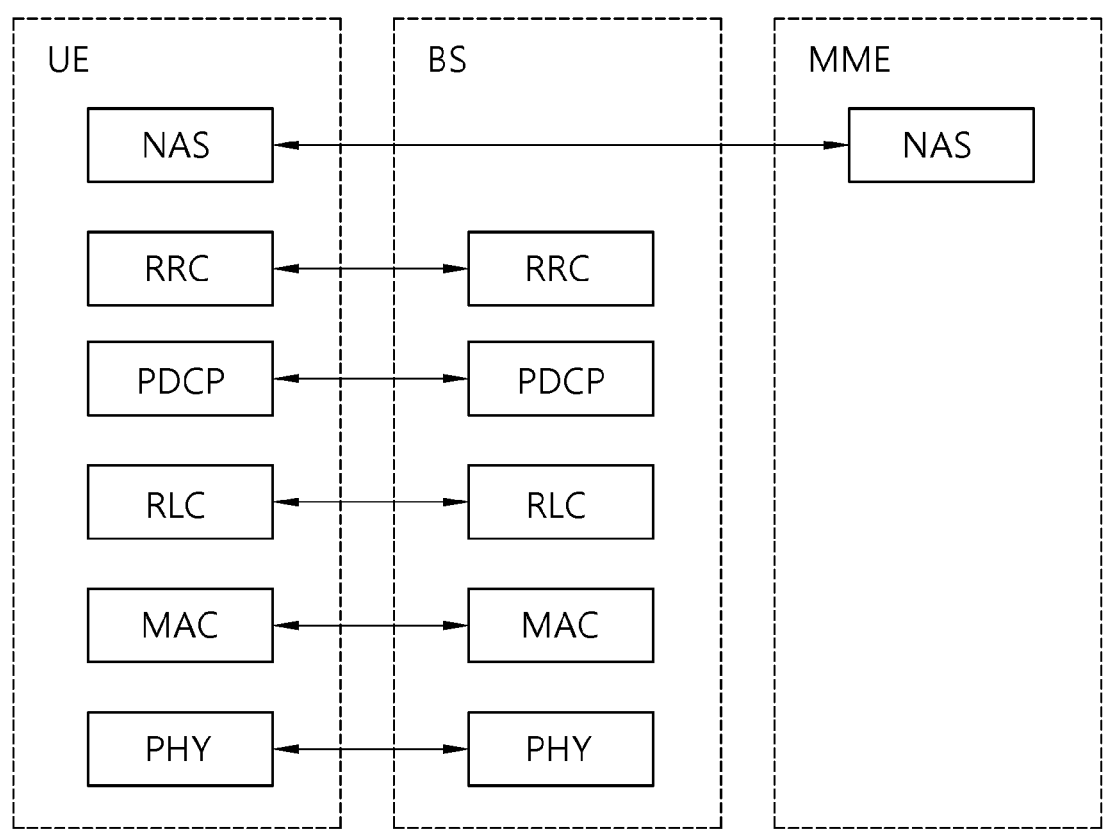
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined.

The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
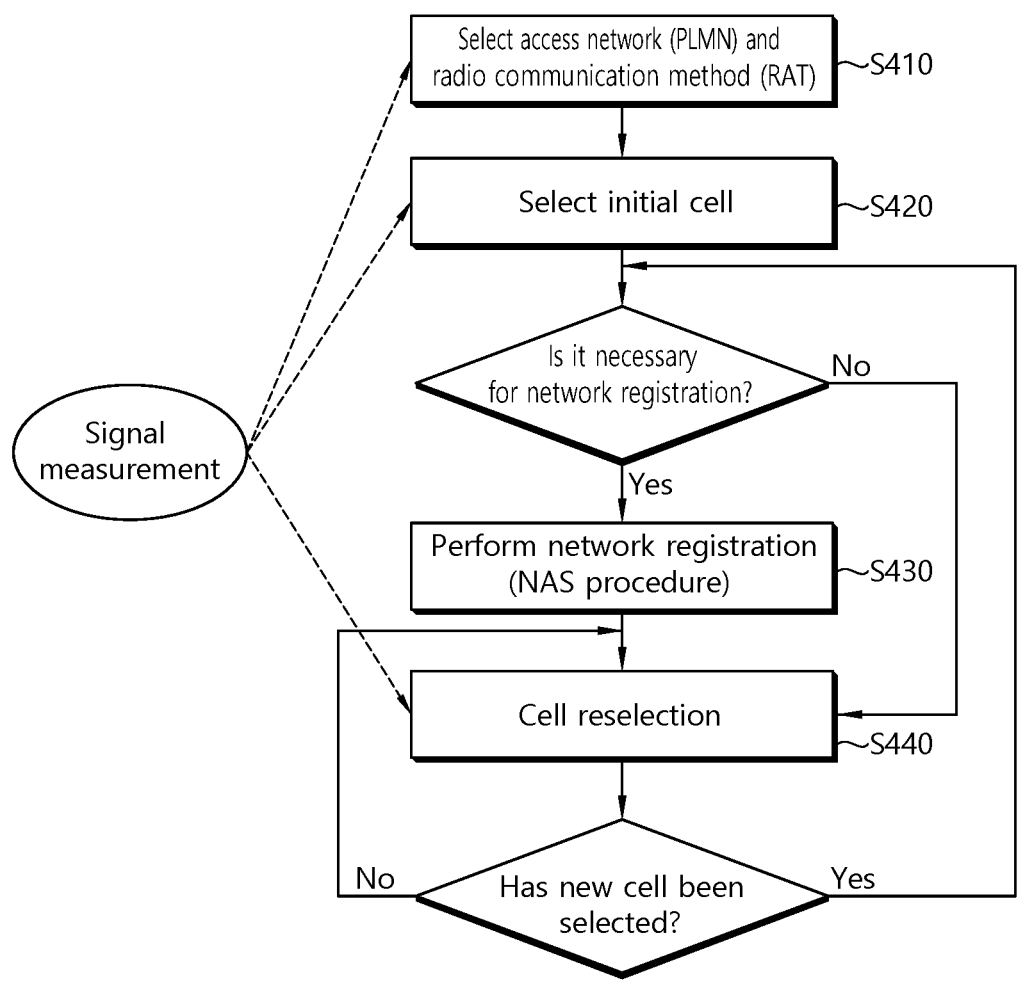
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
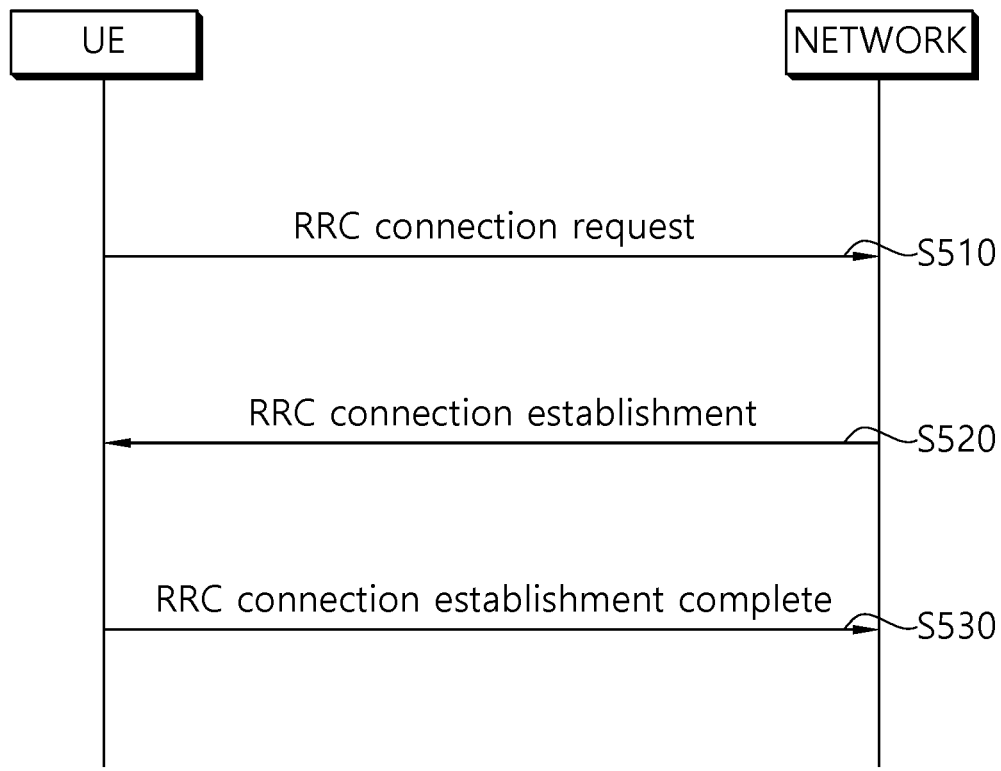
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
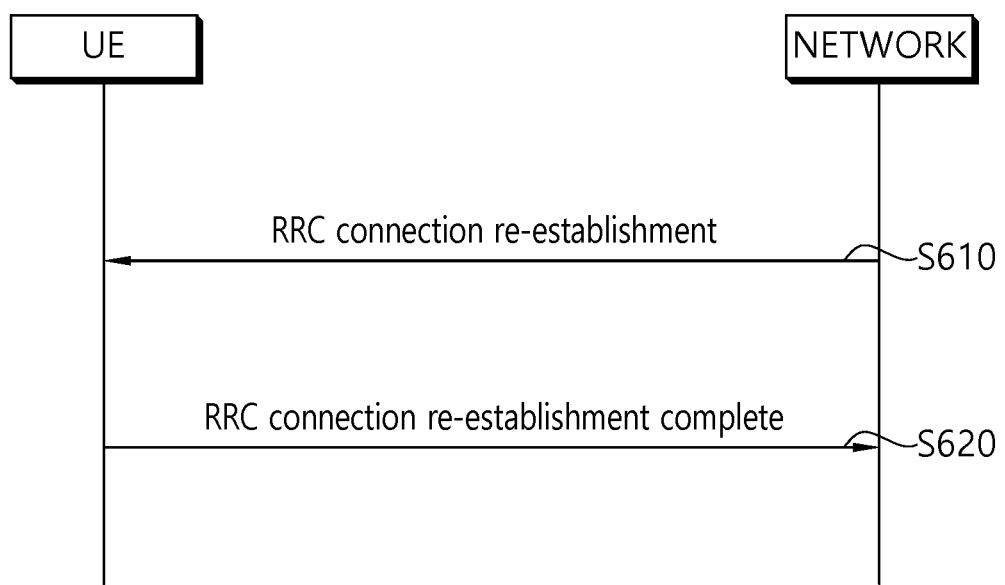
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.50 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srlev>0 \text{ AND } Squal>0. \qquad \text{[Equation 1]}$$

where:

$$Srlev = Q_{rxlevmeas} - (Q_{rslevmin} + Q_{rxlevminoffset}) - P_{compensation},$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst} \quad R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
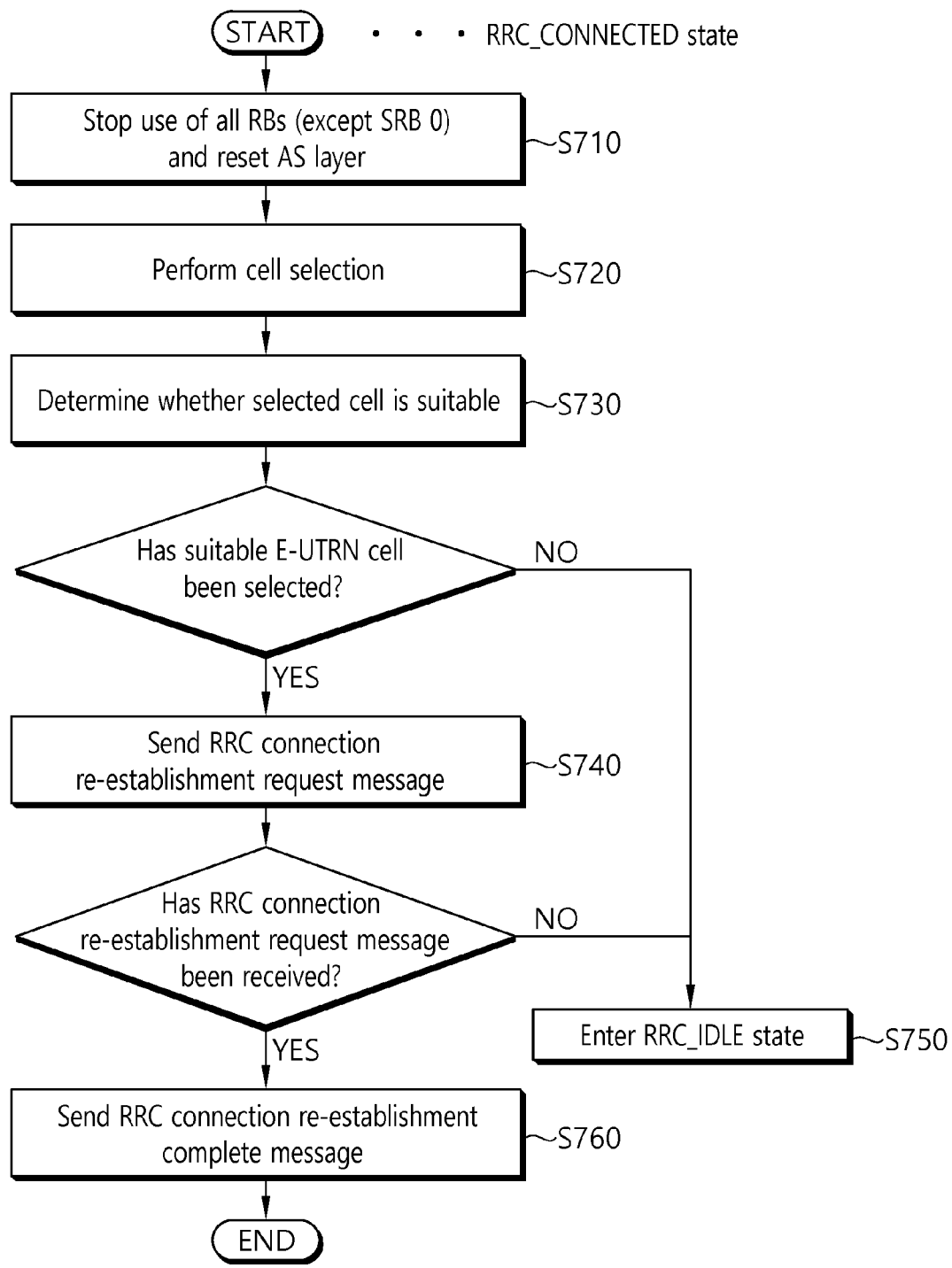
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
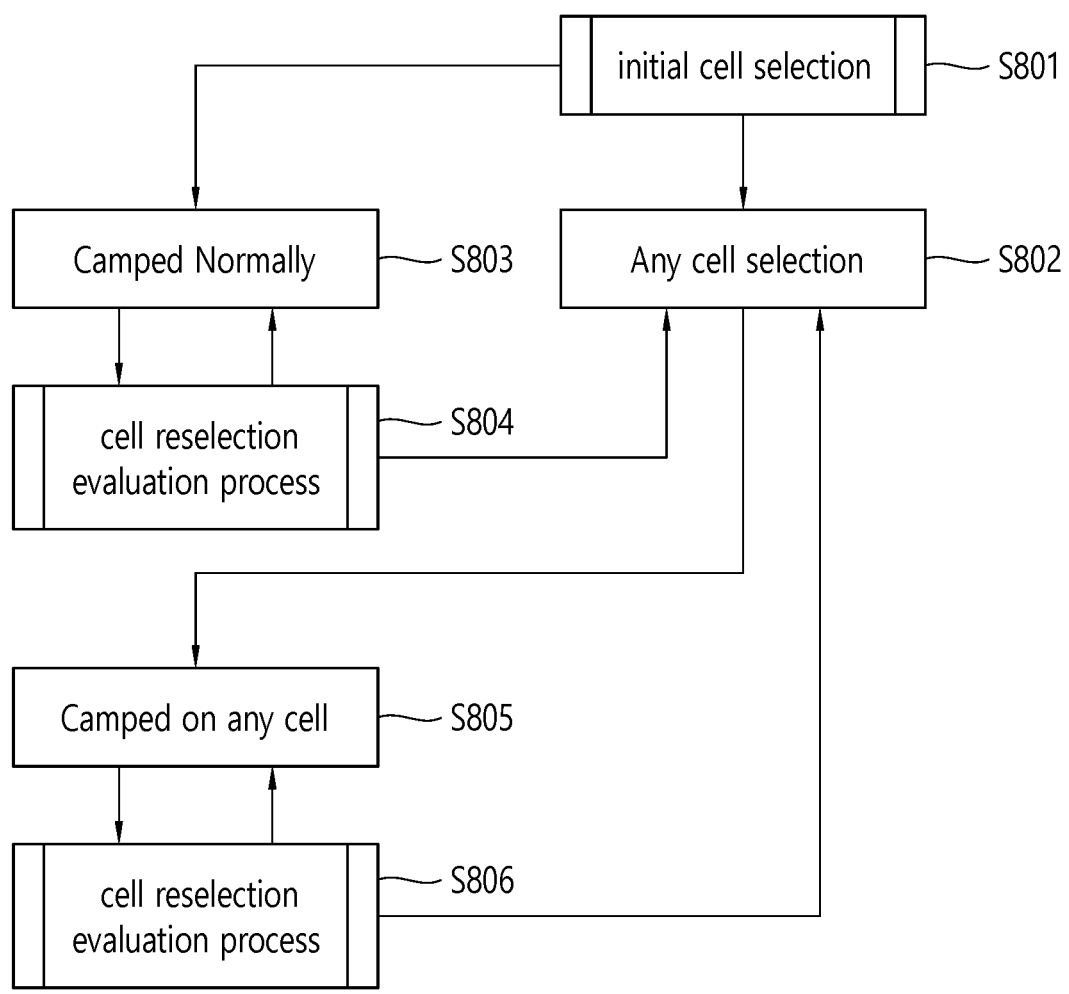
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. Ha suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
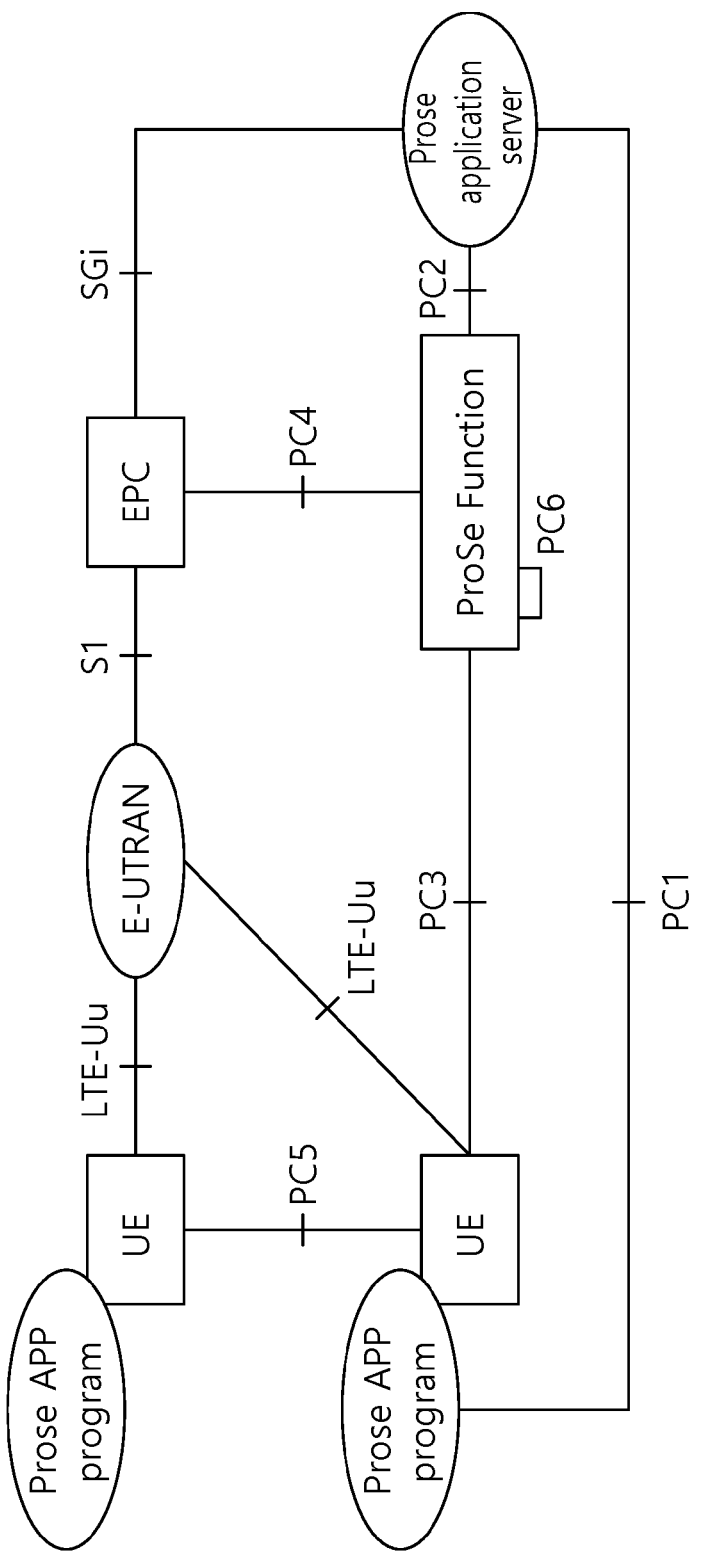
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications
Authorization and configuration of the UE for discovery and direct communication)
Enable the function of the EPC level ProSe discovery
ProSe related new subscriber data and handling of data storage, and also handling of ProSe identities
Security related function
Provide control towards the EPC for policy related function
Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.
PC2: is a reference point between the ProSe application server and a ProSe function. The PC2 is used to define an interaction between the ProSe application server and a ProSe function. An application data update of a ProSe database of the ProSe function may be an example of the interaction.
PC3: is a reference point between the terminal and the ProSe function. The PC3 is used to define an interaction between the terminal and the ProSe function. Configuration for ProSe discovery and communication may be an example of the interaction.
PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
PC5: is a reference point to use control/user plane for discovery, communication, and relay between terminals, and 1:1 communication.
PC6: is a reference point to use a function such as ProSe discovery between users included in different PLMNs.
SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
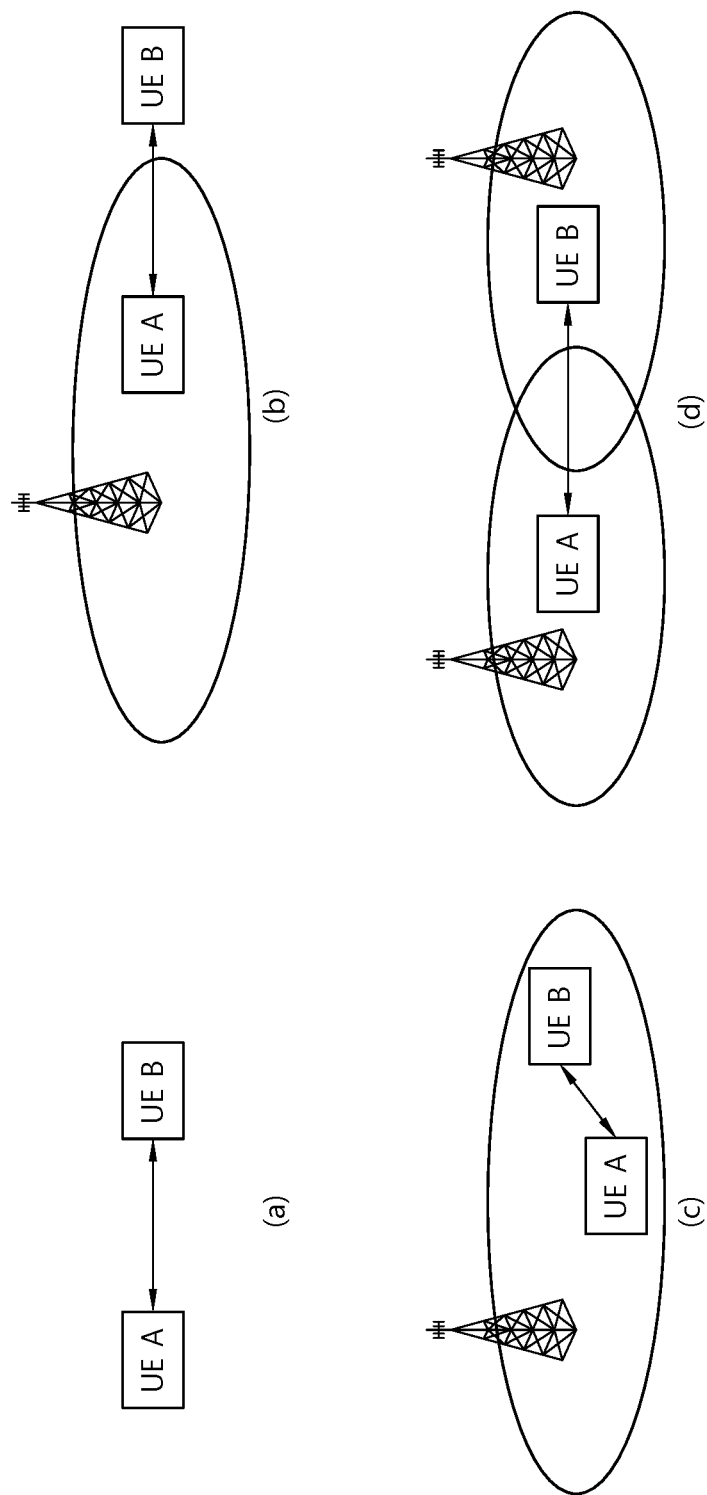
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.
Purpose layer-2 ID: The purpose layer-2 ID identifies a target of a packet in a PC 5 interface.
SA L1 ID: The SA L1 ID represents an in an ID in a scheduling assignment (SA) in the PC 5 interface.

Figure 11:
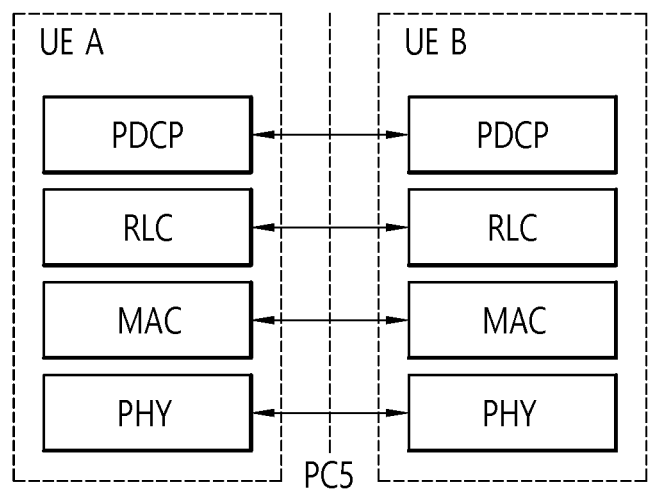
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
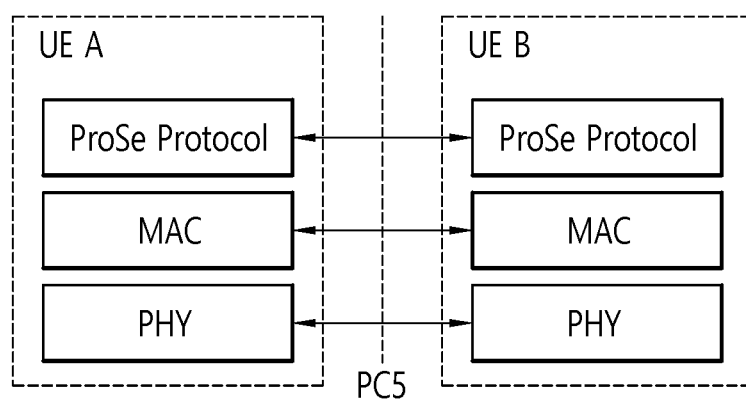
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

<Sidelink Wireless Device Information>

The sidelink wireless device information (sidelink UE information) message may be used in conjunction with an indication of the sidelink information to the network.

The sidelink wireless device information message may contain the following contents:

```
-- ASN1START
SidelinkUEInformation-r12 ::=        SEQUENCE {
    criticalExtensions               CHOICE {
        c1                           CHOICE {
            sidelinkUEInformation-r12      SidelinkUEInformation-r12-ffis,
            spare3 NULL, spare2 NULL, spare1 NULL
        },
        criticalExtensionsFuture     SEQUENCE { }
    }
}
SidelinkUEInformation-r12-IEs ::= SEQUENCE {
    commRxInterestedFreq-r12         ARFCN-ValueEUTRA-r9         OPTIONAL,
    commTxResourceReq-r12            SL-CommTxResourceReq-r12    OPTIONAL,
    discRxInterest-r12               ENUMERATED {true}           OPTIONAL,
    discTxResourceReq-r12            INTEGER (1..63)             OPTIONAL,
    lateNonCriticalExtension         OCTET STRING                OPTIONAL,
    nonCriticalExtension             SEQUENCE { }                OPTIONAL
}
SL-CommTxResourceReq-r12 ::=         SEQUENCE {
    carrierFreq-r12                  ARFCN-ValueEUTRA-r9         OPTIONAL,
    destinationInfoList-r12          SL-DestinationInfoList-r12
}
SL-DestinationInfoList-r12 ::= SEQUENCE (SIZE (1..maxSL-Dest-r12)) OF SL-DestinationIdentity-r12
SL-DestinationIdentity-r12 ::= BIT STRING (SIZE (24))
-- ASN1 STOP
```

'commRxInterestedFreq' may be information indicating the frequency that the wireless device is interested in using when receiving the sidelink direct communication.

'commTxResourceReq' may be information indicating the frequency that the wireless device is interested in using when transmitting the sidelink direct communication. Furthermore, 'commTxResourceReq' may be the information indicating the sidelink direct communication transmission destination that the wireless device requests from the network to allocate the dedicated resources.

'DiscRxInterest' may be information indicating another wireless device for which the wireless device is interested in monitoring the sidelink direct discovery announcement.

'discTxResourceReq' may be information indicating the number of resources requested by the wireless device at every discovery period in relation to transmitting the sidelink direct disco very announcement. 'discTxResourceReq' may affect the number of separate discovery messages that the wireless device wants to transmit every discovery period.

'destinationInfoList' may be the information indicating the destination identified by the ProSe layer 2 group ID.

<System Information Block Type 5>

The information element (IE) of system information block type 5 (SIB 5) contains only information associated with inter-frequency cell reselection (that is, information associated with other network frequencies and the inter-network frequency of the neighboring cell with respect to cell reselection). In addition to the cell-specific reselection parameter, the element may include a cell reselection parameter common to the frequencies.

The information element of system information block type 5 may contain the following information:

```
-- ASN1START
SystemInformationBlockType5 ::=        SEQUENCE {
    interFreqCarrierFreqList           InterFreqCarrierFreqList,
    ...,
    lateNonCriticalExtension           OCTET STRING (CONTAINING
SystemInformationBlockType5-v8h0-IEs)            OPTIONAL
}
SystemInformationBlockType5-v8h0-IEs ::=  SEQUENCE {
    interFreqCarrierFreqList-v8h0  SEQUENCE (SIZE (1..maxFreq)) OF
InterFreqCarrierFreqInfo-v8h0              OPTIONAL, -- Need OP
    nonCriticalExtension            SystemInformationBlockType5-v9e0-IEs       OPTIONAL
}
SystemInformationBlockType5-v9e0-IEs ::=   SEQUENCE {
    interFreqCarrierFreqList-v9e0    SEQUENCE (SIZE (1..maxFreq)) OF
InterFreqCarrierFreqInfo-v9e0              OPTIONAL, -- Need OR
    nonCriticalExtension             SEQUENCE { }                               OPTIONAL
}
InterFreqCarrierFreqList ::=         SEQUENCE (SIZE (1..max.Freq)) OF
InterFreqCarrierFreqInfo
InterFreqCarrierFreqInfo ::=    SEQUENCE {
    dl-CarrierFreq                   ARFCN-ValueEUTRA,
    q-RxLevMin                       Q-RxLevMin,
    p-Max                            P-Max                         OPTIONAL,   --
Need OP
    t-ReselectionEUTRA               T-Reselection,
    t-ReselectionEUTRA-SF            SpeedStateScaleFactors        OPTIONAL,   -
- Need OP
    threshX-High                     ReselectionThreshold,
    threshX-Low                      ReselectionThreshold,
    allowedMeasBandwidth             AllowedMeasBandwidth,
    presenceAntennaPort1             PresenceAntennaPort1,
    cellReselectionPriority          CellReselectionPriority       OPTIONAL,   --
Need OP
    neighCellConfig                  NeighCellConfig,
    q-OffsetFreq                     Q-OffsetRange                 DEFAULT dB0,
    interFreqNeighCellList           InterFreqNeighCellList        OPTIONAL, --
Need OR
    interFreqBlackCellList           InterFreqBlackCellList        OPTIONAL, --
Need OR
    ...,
    [[  q-QualMin-r9                 Q-QualMin-r9                  OPTIONAL,  --
Need OP
        threshX-Q-r9                 SEQUENCE {
            threshX-HighQ-r9             ReselectionThresholdQ-r9,
            threshX-LowQ-r9              ReselectionThresholdQ-r9
        }                                                          OPTIONAL  --
Cond RSRQ
    ]],
    [[  q-QualMinWB-r11              Q-QualMin-r9                  OPTIONAL --
Cond WB-RSRQ
    ]]
}
InterFreqCarrierFreqInfo-v8h0 ::=   SEQUENCE {
    multiBandInfoList                MultiBandInfoList             OPTIONAL   -- Need
OR
}
InterFreqCarrierFreqInfo-v9e0 ::=   SEQUENCE {
    dl-CarrierFreq-v9e0              ARFCN-ValueEUTRA-v9e0         OPTIONAL,  --
Cond dl-FreqMax
    multiBandInfoList-v9e0           MultiBandInfoList-v9e0        OPTIONAL   -- Need
OR
}
InterFreqNeighCellList ::=         SEQUENCE (SIZE (1..maxCellInter)) OF
InterFreqNeighCellInfo
```

```
InterFreqNeighCellInfo ::=        SEQUENCE {
    physCellId                        PhysCellId,
    q-OffsetCell                      Q-OffsetRange
}
InterFreqBlackCellList ::=        SEQUENCE (SIZE (1..maxCellBlack)) OF
PhysCellIdRange
-- ASN1STOP
```

'interFreqBlackCellList' may be information indicating a list of inter-frequency neighboring cells considered as a black list.

'interFreqCarrierFreqList' may be information indicating a list of neighboring inter-frequencies.

'InterFreqNeighCellList' may be information about a list of inter-frequency neighboring cells together with a specific cell reselection parameter.

'multiBandInfoList' may be information indicating a list of frequency bands in addition to the band indicated by 'dl-CarrierFreq' common to the cell reselection parameters (In this connection, 'dl-CarrierFreq' may mean the carrier frequency that helps the wireless device find the cell).

'p-Max' may be a value that may be applied to a neighboring network cell on the carrier frequency.

<System Information Block Type 19>

The configuration element of system information type 19 (SIB19) may indicate information that the network supports the sidelink wireless device information procedure. Furthermore, the configuration element of system information block type 19 may include sidelink direct discovery associated with resource configuration information.

The system information block type 19 may contain the following information:

discInterFreqList' may be the information indicating the adjacent frequencies at which the sidelink direct discovery announcement is supported.

'discRxPool' may mean information indicating the resource using which the wireless device is allowed to receive the sidelink direct discovery announcement during the RRC idle state and the RRC connected state.

'discSyncConfig' may be information indicating the configuration in which the wireless device is allowed to send and receive synchronization information.

'discTxPoolCommon' may be information indicating the resources using which the wireless device is allowed to send the sidelink direct discovery announcement during the RRC idle state.

'plmn-IdentityList' may be a list of PLMN identities corresponding to adjacent frequencies indicated by the carrier frequency.

'plmn-Index' may refer to the index of the corresponding entry in plmn-IdentityList field belonging to SIB1.

Hereinafter, the present invention will be described in detail.

In a D2D operation (or ProSe operation), any one of a plurality of wireless devices supporting D2D operation may announce information that may be used by the D2D operation-enabled wireless device to perform a D2D operation. In other words, one wireless device that supports D2D operation may notify other wireless devices that it (that is, one wireless device that supports D2D operation) supports D2D operation. That is, a wireless device that supports D2D

```
-- ASN1 START
SystemInformationBlockType19-r12 ::= SEQUENCE {
    discConfig-r12              SEQUENCE {
        discRxPool-r12              SL-DiscRxPoolList-r12,
        discTxPoolCommon-r12        SL-DiscTxPoolList-r12            OPTIONAL,
    -- Need OR
        discTxPowerInfo-r12         SL-DiscTxPowerInfoList-r12       OPTIONAL, --
Cond Tx
        discSyncConfig-r12          SL-SyncConfigList-r12            OPTIONAL --
Need OR
    }                                                                OPTIONAL, --
Need OR
    discInterFreqList-r12       SL-CarrierFreqInfoList-r12           OPTIONAL,    -- Need
OR
    lateNonCriticalExtension    OCTET STRING                         OPTIONAL,
    ...
}
SL-CarrierFreqInfoList-r12 ::= SEQUENCE (SIZE (1..maxFreq)) OF SL-CarrierFreqInfo- 12
SL-CarrierFreqInfo-r12::=       SEQUENCE {
    carrierFreq-r12                 ARFCN-ValueEUTRA-r9,
    plmn-IdentityList-r12           PLMN-IdentityList4-r12           OPTIONAL    -- Need
OP
}
PLMN-IdentityList4-r12 ::=      SEQUENCE (SIZE (1..maxPLMN-r11)) OF    PLMN-
IdentityInfo2-r12
PLMN-IdentityInfo2-r12 ::=      CHOICE {
    plmn-Index-r12                  INTEGER (1..maxPLMN-r11),
    plmnIdentity-r12                PLMN-Identity
}
-- ASN1STOP
``` operation may perform sidelink direct discovery announcement. In this connection, the discovery announcement described above may be performed using the discovery resources configured by the RRC layer.

Further, another one of the plurality of wireless devices supporting the D2D operation may monitor D2D information announced by another wireless device, that is, discovery announcement, to perform D2D operation.

In this connection, the wireless device performing the sidelink direct discovery announcement may broadcast a discovery message in a preconfigured discovery interval. The wireless device monitoring the discovery announcement may read the D2D information described above and perform post-processing on the read result.

When the wireless device performs the discovery announcement described above, the RSRP-based resource pool selection may be required toward the wireless device for transmission resource allocation of non-primary cells. That is, in order for the wireless device to perform discovery announcement in a non-primary cell (non-PCell), the resource pool to be used to perform the discovery announcement may need to be selected. In such a case, the wireless device (that is, the wireless device performing the discovery announcement) may need to know the measurement bandwidth in order to perform resource pool selection based on the RSRP measurement of the cell (that is, non-primary cell).

However, if the wireless device is interested in performing discovery announcement on a frequency not listed in the reselection frequency information received via the system information, the wireless device may not know the measurement bandwidth of the frequency (that is, the frequency not listed in the reselection frequency information). In summary, if the frequency to be used by the wireless device to perform the discovery announcement is not included in the system information of the current serving cell (in particular, system information block 5 (SIB 5) or measurement target), it may be difficult for the wireless device to perform discovery announcement at the frequency.

In response to this, in the following, when the system information about the frequency to be used by the device when the wireless device performs the discovery announcement is insufficient, that is, when the information about the frequency that the wireless device intends to use to perform the discovery announcement is insufficient in the SIB 5 or the measurement target as received from the serving cell of the wireless device, the network may further provide information about the frequency to the wireless device. This scheme will be described in detail below.

Figure 13:
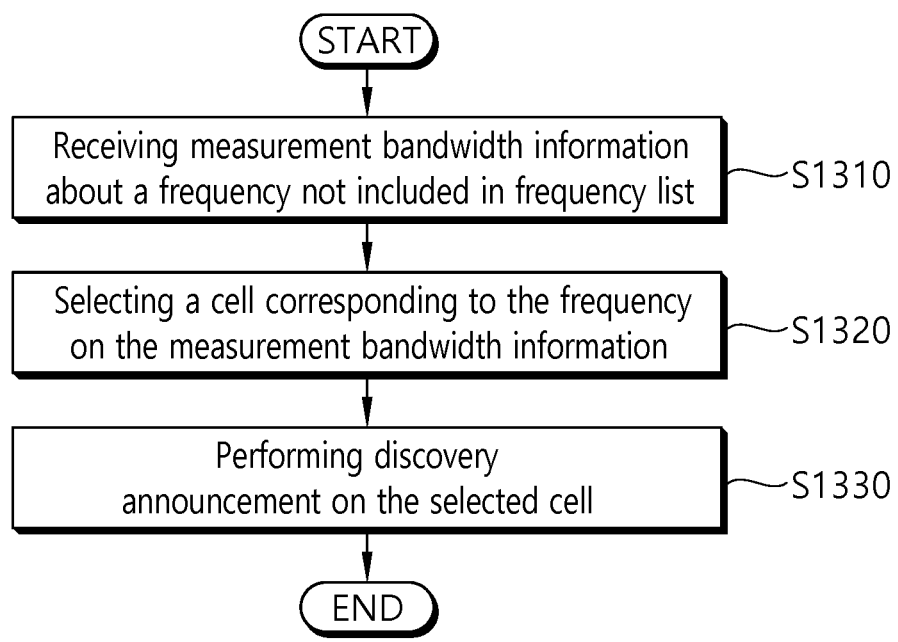
FIG. 13 is a flowchart of a method of receiving measurement bandwidth information to perform a discovery announcement according to an embodiment of the present invention.

FIG. 13 is a flowchart of a method of receiving measurement bandwidth information to perform a discovery announcement according to an embodiment of the present invention.

Referring to FIG. 13, the wireless device receives measurement bandwidth information about a frequency not included in the system information received by the wireless device (S1310). That is, the wireless device may separately receive, from the serving cell, the measurement bandwidth information about the frequency not included in the information indicating the measurement target with the purpose for supporting the mobility of the wireless device. In this connection, the frequency that does not be included in the system information (or frequency list) received by the wireless device may mean a frequency not included in system information block 5 (SIB5) or measurement target (s). The details of the SIB 5 are as described above. The wireless device may also receive announcement assisting information for performing announcements in the cell on the frequency, in addition to the measurement bandwidth information.

The following is a more detailed description of 1. information (that is, announcement assisting information) assisting announcement by UE, and 2. measurement bandwidth information about a frequency not present in the frequency list received by the wireless device.

1. Announcement Assisting Information

The serving cell may provide the wireless device with assisting information that assists the announcement by the wireless device. That is, the wireless device may receive measurement bandwidth information about frequencies not included in the information about the frequency list from the serving cell. In this connection, the above assisting information may include 'cp-length', 'discPeriod', 'numRetx', 'numRepetition', 'tf-ResourceConfig' and 'txParameters' defined in the SL-DiscResourcePool.

In this connection, 'SL-DiscResourcePool' may represent configuration information about a separate pool of resources used for sidelink discovery. 'SL-DiscResourcePool' may be defined as an example as shown below:

```
-- ASN1START
SL-DiscTxPoolList-r12 ::=    SEQUENCE (SIZE (1..maxSL-TxPool-r12)) OF SL-
DiscResourcePool-r12
SL-DiscRxPoolList-r12 ::=    SEQUENCE (SIZE (1..maxSL-RxPool-r12)) OF SL-
DiscResourcePool-r12
SL-DiscResourcePool-r12 ::=       SEQUENCE {
    cp-Len-r12                    SL-CP-Len-r12,
    discPeriod-r12                ENUMERATED {rf32, rf64, rf128,
                                      rf256, rf512, rf1024, spare2, spare},
    numRetx-r12                   INTEGER (0..3),
    numRepetition-r12             INTEGER (1..50),
    tf-ResourceConfig-r12         SL-TF-ResourceConfig-r12,
    txParameters-r12              SEQUENCE {
        txParametersGeneral-r12       SL-TxParameters-r12,
        ue-SelectedResourceConfig-r12 SEQUENCE {
            poolSelection-r12             CHOICE {
                rsrpBased-r12                 SL-PoolSelectionConfig-r12,
                random-r12                    NULL
            },
            txProbability-r12             ENUMERATED {p25, p50, p75, p100}
        }                                             OPTIONAL    -- Need OR
    }                                                 OPTIONAL,   -- Cond Tx
    rxParameters-r12              SEQUENCE {
        tdd-Config-r12                TDD-Config    OPTIONAL,    -- Need
```

```
OR
    syncConfigIndex-r12        INTEGER (0..15)
    }                                          OPTIONAL,    -- Need OR
    ...
}
SL-PoolSelectionConfig-r12 ::=   SEQUENCE {
    threshLow-r12                    RSRP-RangeSL2-r12,
    threshHigh-r12                   RSRP-RangeSL2-r12
}
-- ASN1STOP
```

'cp-length'. 'discPerioc', 'numRepetition', 'tf-Resource-Config' and 'txParameters' may be as follows:

'cp-length' may be information about the length of the periodic transposition code.

'discPeriod' may mean information indicating the period in which resources are allocated in the cell for discovery message transmission and/or reception.

'numRepetition' may mean information indicating the number of 'subframeBitmap' that is repeated to map to a subframe occurring in 'discPeriod'.

'tf-ResourceConfig' may mean information indicating a set of time and/or frequency used for sidelink.

'txParameters' may mean information for identifying a set of parameters used for communication, discovery and synchronization, and configured for sidelink transmission.

Thus, the cell may need to signal, via the SIB 19, transmission resource parameter(s) corresponding to cells of other frequencies (that is, frequencies to be used to perform the discovery announcement). In this connection, the details of SIB19 are as described above. As soon as the wireless device receives the transmission resource pool parameter (s) and available assisting information corresponding to the non-primary cell, the wireless device may use the resource pool and other information about announcement on the frequency (that is, the frequency to be used to perform the discovery announcement), regardless of the MIB, SIB1 and SIB19 of the non-primary cell (that is, without reading the MIB, SIB1 and SIB19 of the non-primary cell). To summarize, the wireless device may receive, from the cell, assisting information (e.g., transmission resource parameter(s) corresponding to the cell of the frequency to be used to perform the discovery announcement, in formation required for announcement, etc.) about the frequency to be used to perform the discovery announcement.

The above-described measurement bandwidth information, that is, measurement information of the bandwidth of the frequency not included in the information about the frequency list, may be applied in both of the RRC idle state and the RRC connected state.

2. Measurement Bandwidth Information

1) When the Wireless Device is in the RRC Idle State

The cell may signal the ProSe measurement bandwidth via the system information (e.g., system information block (SIB)), in addition to the above transmission resource pool information (that is, information about the cell on the frequency to be used by the wireless device to perform the discovery announcement). More specifically, the cell may signal the measurement bandwidth information about a frequency not listed in the reselection frequency information via SIB5. That is, the measurement bandwidth information ma y be signalled for each frequency. In summary, in order for the wireless device to perform discovery announcement on the frequency not included in the SIB 5, the wireless de vice may receive measurement information of the bandwidth of the frequency not include d in the SIB 5, that is, the measurement bandwidth information.

When the wireless device is interested in announcing discovery on a frequency included in the reselection frequency information in the RRC idle state, the wireless device uses measurement bandwidth information included in the reselection frequency information to measure the frequency.

When the wireless device is interested in announcing discovery on a frequency that is not included in the reselection frequency information, the wireless device may use available measurement bandwidth information about the frequency included in the newly received information (that is, a system information block containing information that can measure the bandwidth of a frequency not included in SIB5) for the ProSe operation by the wireless device, as described above. That is, when the wireless device intends to perform the discovery announcement on the frequency not included in SIB5, the wireless device e uses the bandwidth information about the frequency not included in the SIB 5 as described above such that the discovery announcement may be performed by the device vi a the cell on the frequency that is not included in SIB5.

2) When the Wireless Device is in the RRC Connected State

The cell may signal the ProSe measurement bandwidth in a dedicated signaling manner, in addition to transmission resource pool information (which is information about a cell on a frequency to be used for performing the discovery announcement). More specifically, the cell may signal measurement bandwidth information of a frequency not listed in the list of measurement targets(s) (that is, the measurement bandwidth information may be signaled for each frequency). In summary, the wireless device may receive measurement bandwidth information of a frequency not present in the list of measurement targets, and, then, the wireless device may perform the discovery announcement in a cell on the frequency that is not present in the list of measurement targets, based on the measurement bandwidth information.

When the wireless device is interested in announcing discovery on a frequency that is not included in the list of measurement target(s) in the RRC connected state, the wireless device may use measurement bandwidth information included in the corresponding measurement target configuration to measure the frequency (that is, the frequency not included in the list of the measurement targets).

Even when there is no measurement ID for the measurement target, the wireless device must measure the measurement target. Therefore, when the wireless device is interested in a discovery announcement on a frequency that is not included in the list of the measurement target(s), the following schemes may be applied selectively.

Selection 1: the wireless device may use measurement bandwidth information signalled via dedicated signalling applicable to the frequency (that is, the frequency not included in the list of the measurement targets).

Selection 2: if the wireless device can use the measurement bandwidth information signalled via the reselection information (e.g., SIB5), the wireless device uses the measurement bandwidth information. If the wireless device cannot use the measurement bandwidth information signalled via the reselection information, a value provided by the dedicated signalling applicable to the frequency (that is, the frequency not included in the list of measurement targets) may be used by the wireless device.

The wireless device may use the measurement result of the frequency to select or reselect the best-ranked cell on the frequency based on intra-frequency reselection on the frequency. The wireless device may have to use the selected cell to perform the announcement on the frequency (that is, the wireless device may have to use the transmission resource corresponding to the selected cell).

The wireless device may use the measurement result of the selected cell for the ProSe operation to select a transmission resource (e.g., transmission resource pool) corresponding to the selected cell for the ProSe operation.

In operation S1320, the wireless device selects a cell corresponding to the frequency to perform the discovery announcement based on measurement bandwidth information about the frequency that does not exist in the frequency list received by the wireless device. That is, the wireless device may select the cell corresponding to the frequency by measuring the frequency not included in the measurement target for supporting mobility, based on the measurement bandwidth information.

The wireless device may also perform measurements by applying measurement bandwidth information about the frequency of interest (that is, the frequency that the UE is interested in using to perform the discovery announcement). In this connection, the measurement bandwidth may be determined based on the frequency of interest, or the frequency of interest corresponding to a value signalled as a portion of the ProSe configuration, or based on the reselection frequency information corresponding to the measurement target.

In summary, the wireless device determines the frequency to be used by the wire less device to perform the discovery announcement based on the measurement bandwidth information received by the wireless device. A cell corresponding to the frequency may be determined as a cell to be used for discovery announcement. The details of selecting the cell used for performing the discovery announcement in the RRC idle state and the RRC connected state by the wireless device will be described later.

Thereafter, the wireless device may perform the discovery announcement via the selected cell (S1330). In this connection, a specific example of performing the discovery announcement via the selected cell by the wireless device will be described later.

Hereinafter, 1. a method of receiving measurement bandwidth information for a discovery announcement in an RRC idle state and 2. a method of receiving measurement bandwidth information for a discovery announcement in an RRC connected state will be described in detail.

1. Method of Receiving Measurement Bandwidth Information for Discovery Announcement in RRC Idle State FIG. 14 is a flowchart of a method of receiving measurement bandwidth information for a discovery announcement according to another embodiment of the present invention.

Figure 14:
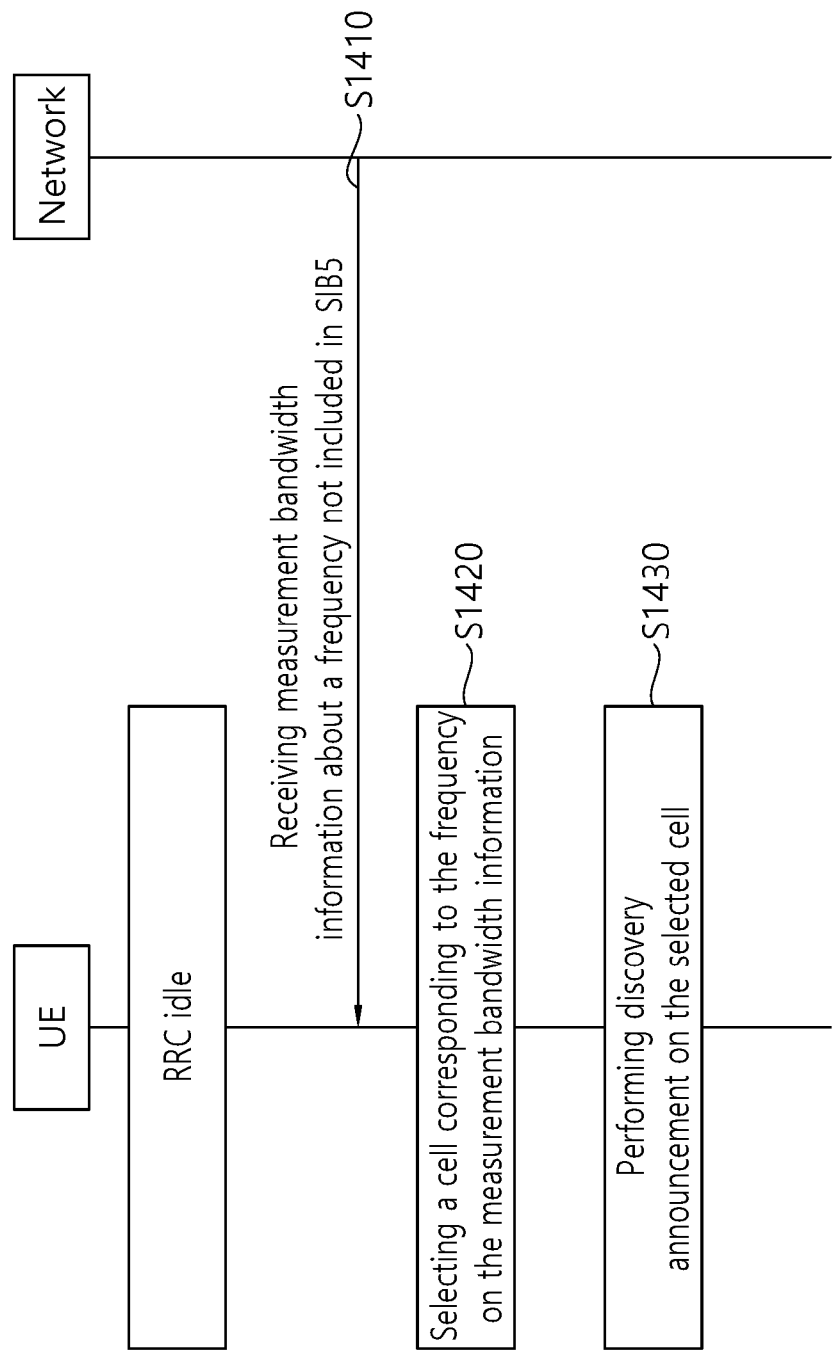
FIG. 14 is a flowchart of a method of receiving measurement bandwidth information for a discovery announcement according to another embodiment of the present invention.

Referring to FIG. 14, the wireless device receives measurement bandwidth information about a frequency not present in the system information received by the wireless device (S1410). The measurement bandwidth information about the frequency not present in the system information (or frequency list) received by the wireless device may mean bandwidth information about a frequency not included in the SIB 5. The details of the bandwidth information regarding the frequency not included in the SIB 5 are as described above. As the wireless device receives measurement bandwidth information, the wireless device may also receive the announcement assisting information. Details of such announcement assisting information are as described above.

Thereafter, the wireless device selects a cell corresponding to the frequency based on the measurement bandwidth information (S1420).

More specifically, in order to support discovery announcements on non-primary cells (that is, on inter-frequency cells), the wireless device may first need to select cells to be used for the discovery announcement.

In this connection, the cell selection described above may be applied to ProSe direct communication where the wireless device performs additional intra-frequency reselection based on additional measurements. RSRP based on transmission resource pool selection may also be used in the case of operation for discovery announcement on the non-primary cell. That is, the wireless device may need to perform measurements on the cell described above. According to current measurement requirements, it is unnecessary for the wireless device to measure a cell with a lower priority than the primary cell. In principle, discovery announcement on the non-primary cell may be delayed per a discovery period, without additional measurements beyond the current measurement requirements.

When the wireless device in RRC idle mode is interested in performing discovery announcement on non-primary cell of inter-frequency, the wireless device performs measurements on the cell without considering the priority of the frequency of the wireless device.

Additional measurements defined in connection with ProSe direct communication in 11.4 of 3GPP TS 36.304 may be applied to the measurement of the frequency of a non-primary cell in which the wireless device is interested in announcing the ProSe direct discovery in the RRC idle state.

Upon receiving the assisting information corresponding to the non-primary cell and the resource pool parameter, the wireless device may use other information and resource pools for announcement using the cell, without reading MIB, SIB 1, and SIB 19 of the cell.

Thereafter, the wireless device may perform discovery announcement based on the selected cell (S1430).

More specifically, it may be assumed that in the RRC idle state, the wireless device is currently camping on the first cell of the first frequency while the wireless device is interested in announcing discovery on the second cell of the second frequency. In this case, to support the discovery announcement on a cell on which the wireless device is not camping (that is, to be able to announce discovery on the second cell of the second frequency), there are two possible following approaches:

Approach 1: the wireless device changes its primary cell using the modified inter-frequency cell reselection method, and then, the wireless device may also perform a discovery announcement on the new primary cell. In summary, the wireless device may determine the cell in which the discovery announcement will be performed as the new primary cell, and then perform the discovery announcement on the changed new primary cell. For example, when the wireless device is camping on the first cell of the first frequency (that is, the first cell of the first frequency is the primary cell) while the wireless device attempts discovery announcement in the second cell of the second frequency, the wireless device changes the primary cell to the second cell of the second frequency (that is, the wireless device reselects the inter-frequency cell as the second cell of the second frequency), so that the wireless device may perform the discovery announcement via the second cell.

Approach 2: the wireless device announces discovery on the inter-frequency cell. That is, the wireless device may perform the discovery announcement on the inter-frequency cell without performing any cell reselection. For example, while the wireless device is camping on the first cell of the first frequency, it may perform the discovery announcement via the second cell of the second frequency.

In this connection, the approach 1 is based on 3GPPP Rel-12 standard where the discovery announcement is only allowed on the primary cell.

In order to change the primary cell of the wireless device into an inter-frequency cell supporting the discovery announcement, the wireless device may need to be allowed to perform frequency prioritization. The approach (that is, approach 1) described above is simple and minimizes the required extensions (e.g., allowing frequency prioritization to be sufficient).

On the other hand, the side effect of this approach (that is, approach 1) may occur when there are multiple frequencies supporting the discovery announcement, when there are multiple frequencies supporting the discovery announcement, the network may not control the frequency on which the wireless device camps to perform the discovery announcement. That is, the camping frequency may be random among the multiple frequencies supporting the discovery announcement.

Another drawback is that the approach (that is, approach 1) described above may not have any benefit in terms of wireless device capacity in performing cellular and discovery operations at the same time.

The approach 2 is based on the elimination of the limitations of Rel-12 as described above (that is, the approach 2 is free from the constraints of Rel-12). With this removal of the constraints, the wireless device may perform discovery announcement on a non-primary cell in the idle period of the current primary cell, without additional enhancement.

When, by a wireless device that cannot perform discovery and cellular operations simultaneously, the discovery announcement on the non-primary cell is performed without any enhancement, it may be predicted that the above-mentioned performance (that is, announcement of discovery is performed without any special enhancement) has the quality of performance of the discovery announcement worse than that of the discovery announcement on the primary-cell.

This is due to followings: a) The current primary cell may not know what cell in which the wireless device is interested in the discovery announcement (that is, the current primary cell may not know what frequency is the frequency at which the wireless device is interested to perform discovery announcement); b) The current primary cell may not know the exact time of discovery opportunity on the cell of interest (that is, interest frequency) in which that the wireless device is interested in performing the discovery announcement.

Because of defections described as above, it is impossible for the wireless device to take such actions as cellular scheduling constraint, for the sake of discovery announcement on the non-primary cell as performed by the wireless device, unless some addition al enhancement is introduced.

Based on the above analysis, and with taking into account that the overall management of the idle mode wireless device is important, the present inventors consider that the approach 2 should be a reference for enhancement for the RRC idle mode, and the approach 2 does not affect the camping operation of the wireless device in the idle mode. It is noted that the transmission of direct communication on the secondary cell or non-serving cell is already supported by Rel-12. As suggested in the approach 2 above, it is desirable to be able to control the wireless device operation of the direct communication and discovery at any time.

In addition to the approach 2 above, the approach 1 has a definite advantage, especially when cellular operation and discovery operation are simultaneously impossible. If reselection to another cell (e.g., low priority cell) is allowed, the wireless device may avoid frequency RF readjustment, which may require discovery announcement on the inter-frequency.

In order to support all of the above proposals, it is necessary to discuss the following additional issues:
  Authority configuration of transmission resource pool corresponding to non-primary cell (for approach 2)
  frequency prioritization (for approach 1)

If there is no assisting information for the announcement on the non-serving cell, the wireless device needs to acquire SIB 19 (system information block 19) from the target non-serving cell. Further, the acquisition of SIB 19 requires that the wireless device access the master information block (MIB) prior to SIB 1. In order to avoid the inefficient operation of the wireless device as described above, it may be considered that the serving cell transmits assisting information for assisting the announcement to the wireless de vice. In this connection, examples of the assisting information may include cp-length, discPeriod, numRetx, numRepetition, tf-ResourceConfig and txParameters included SL-DiscResourcePool.

2. Method for Receiving Measurement Bandwidth Information for Discovery Announcement in RRC Connected State FIG. 15 is a flowchart of a method of receiving measurement bandwidth information for discovery announcement according to another embodiment of the present invention.

Figure 15:
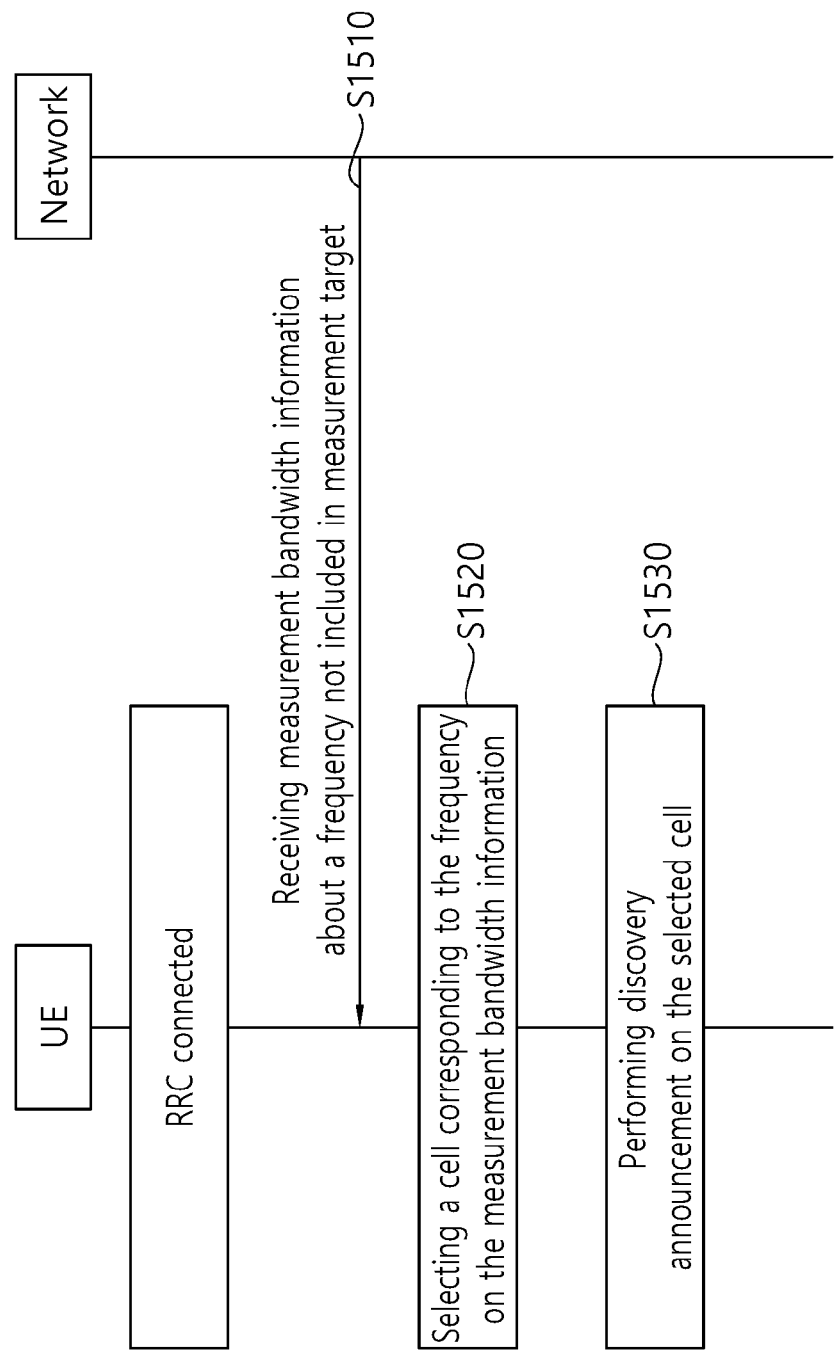
FIG. 15 is a flowchart of a method of receiving measurement bandwidth information for discovery announcement according to another embodiment of the present invention.

Referring to FIG. 15, the wireless device receives measurement bandwidth information regarding a frequency not present in the system information received by the wireless device (S1510). In this connection, the wireless device may receive not only the measurement bandwidth information but also announcement assisting information used for performing announcement in the cell corresponding to the frequency. In this connection, the measurement bandwidth information about the frequency that is not present in the system information (or frequency list) received by the wireless device may be as follows:

Selection 1: the wireless device may use measurement bandwidth information signalled via dedicated signalling applicable to the frequency (that is, the frequency not in eluded in the list of the measurement targets).
  Selection 2: if the wireless device can use the measurement bandwidth information signalled via the reselection information (e.g., SIB5), the wireless device uses the measurement bandwidth information. If the wireless device cannot use the measurement bandwidth information signalled via the reselection information, a value provided by the dedicated signalling applicable to the frequency (that is, the frequency not included in the list of measurement targets) may be used by the wireless device.

In summary, the wireless device in the RRC connected state may receive the measurement bandwidth information via the dedicated signalling.

The wireless device then selects the cell of the frequency to perform the discovery announcement based on measurement bandwidth information about the frequency that is not present in the frequency list received by the wireless device (S1520).

More specifically, there are three scenarios that may be considered for the discovery announcement in the RRC connected state:

first scenario: announcement on primary cell
second scenario: announcement on secondary cell
third scenario: announcement on non-serving cell (e.g., inter-frequency cell)

In this connection, the first scenario is supported by 3GPP Rel-12, and, thus, the following two scenarios, that is, second and third scenarios need to be discussed below.

The first discussion is whether discovery announcement by the wireless device is allowed on a non-secondary cell while the wireless device is already configured to be allowed to perform the discovery announcement on the secondary cell. It may be inappropriate that it is allowed that the announcement on the non-secondary cell is performed on a secondary carrier because, if the announcement on the non-secondary cell is performed on the secondary carrier, the announcement on the non-secondary cell may interfere with the uplink of the secondary cell.

Similar discussion arises about discovery announcement on non-serving frequency. Thus, it should be determined whether the device is allowed to announce discovery on the best-ranked cell on the non-serving frequency. As mentioned, in order to take ProSe direct communication, the wireless device may use the best-ranked cell on the non-serving frequency, for a ProSe direct discovery announcement on the non-serving frequency. This requires the additional requirements to be introduced below. When the wireless device in the RRC connected state is interested in performing discovery announcement on a non-serving cell (that is, a cell on the inter-frequency), measurement on the frequency of the cell may be performed by the wireless device although the frequency of the cell is not the measurement target.

Additional measurements defined for ProSe direct communication as disclosed in 11.4 of 3GPP TS 36.304 may be applied to measurements on the frequency of a non-primary cell in which the wireless device in the RRC connected state is interested in carrying out the announcement of ProSe direct discovery.

With respect to the discovery announcement on the non-serving frequency, the wireless device in the RRC connected state may be allowed to announce discovery on the cell selected by intra-frequency reselection.

When the wireless device enters the RRC connected state, the wireless device may indicate the interest in receiving, transmitting, or transmitting or receiving of the discovery by transmitting sidelink wireless device information.

The wireless device may be interested in announcing discovery on a specific secondary cell. In this case, for example, the wireless device may indicate a serving cell index, as a portion of a transmission resource request, or the wireless device may indicate a carrier frequency of the serving cell as a portion of a transmission resource request. Assuming that the difference in signaling size is small, the wireless device may preferably perform the general operation for the above two processes.

The wireless device can indicate, via sidelink wireless device information, the list of carrier frequencies at which the wireless device is interested in performing the discovery announcement. In this connection, the indicated frequency may be the serving frequency and the non-serving frequency.

Thereafter, the wireless device may perform discovery announcement based on the selected cell (S1530). A specific example of performing the discovery announcement via the selected cell by the wireless device is as described above.

Figure 16:
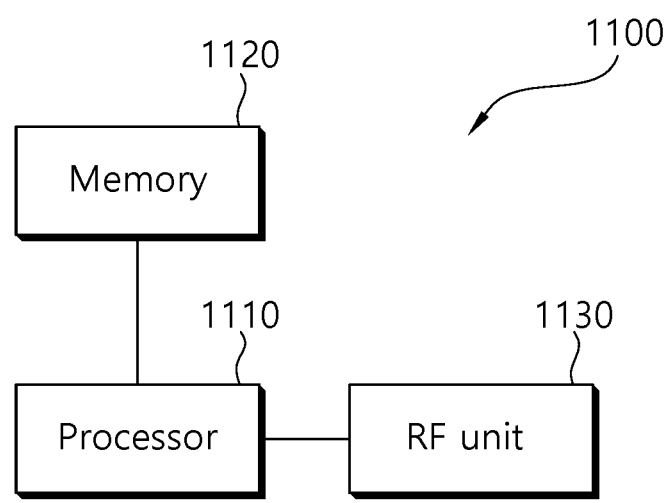
FIG. 16 is a block diagram illustrating a wireless device in which an embodiment of the present invention is implemented.

FIG. 16 is a block diagram illustrating a wireless device in which an embodiment of the present invention is implemented.

Referring to FIG. 16, a wireless device 1100 includes a processor 1110, a memory 1120, and an RF unit (radio frequency unit) 1130. The processor 1110 implements the functionality, processes, and/or methods suggested above. For example, the processor 1110 may receive measurement bandwidth information about a frequency that does not exist in the frequency list received by the wireless device via the RF unit 1130. The processor 1110 may then select a cell corresponding to the frequency to perform the discovery announcement based on measurement bandwidth information about the frequency that is not present in the frequency list received by the wireless device. Further, the processor 1110 may perform the discovery announcement using the cell selected through the RF 1130.

The RF unit 1130 is connected to the processor 1110 to transmit and receive radio signals.

The processor may include an application-specific integrated circuit (ASIC), other chipset, logic circuitry, and/or a data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described approaches or proposals may be implemented with modules (processes, functions, and so on) that perform the functions described above. Modules are stored in memory and are executed by the processor. The memory may be internal or external to the processor, and may be connected to the processor by a variety of well-known connection means.

What is claimed is:

1. A method for performing a device-to-device (D2D) discovery announcement in a wireless communication system, the method performed by a user equipment (UE) and comprising:
receiving, from a network, system information block 5 (SIB 5) related to an inter-frequency cell reflection;
receiving, from the network, measurement bandwidth information including at least one frequency for performing the D2D discovery announcement, when the SIB 5 does not include the at least one frequency for performing the D2D discovery announcement;
selecting a specific cell among at least one non-primary cell based on measuring the at least one non-primary cell on the at least one frequency; and
performing the D2D discovery announcement on the specific cell,
wherein the UE maintains camping on a primary cell while the UE performs the D2D discovery announcement on the specific cell being a non-primary cell, and wherein, when measuring the at least one non-primary cell, the UE only measures the specific cell, which has a priority same or higher than a priority of the primary cell, among the at least one non-primary cell.

2. A user equipment (UE) for performing a device-to-device (D2D) discovery announcement in a wireless communication system, the UE comprising:
   a transceiver configured to transmit and receive a radio signal; and
   a processor operatively coupled to the transceiver, wherein the processor is configured to:
      control the transceiver to receive, from a network, system information block 5 (SIB 5) related to art inter-frequency cell reselection,
      control the transceiver to receive, from the network, measurement bandwidth information including at least one frequency for performing the D2D discovery announcement, when the SIB 5 does not include the at least one frequency for performing the D2D discovery announcement;
      select a specific cell among at least one non-primary cell based on measuring the at least one non-primary cell on the at least one frequency, and
      perform the D2D discovery announcement on the specific cell,
   wherein the UE maintains camping on a primary cell while the processor performs the D2D discovery announcement on the specific cell being a non-primary cell, and
   wherein, when measuring the at least one non-primary cell, the UE only measures the specific cell, which has a priority same or higher than a priority of the primary cell, among the at least one non-primary cell.

* * * * *